US012186904B2

(12) United States Patent
Ahn et al.

(10) Patent No.: US 12,186,904 B2
(45) Date of Patent: Jan. 7, 2025

(54) MANIPULATOR AND METHOD FOR CONTROLLING THEREOF

(71) Applicant: SAMSUNG ELECTRONICS CO., LTD., Suwon-si (KR)

(72) Inventors: Joonmo Ahn, Suwon-si (KR); Boseok Moon, Suwon-si (KR); Dongwoo Park, Suwon-si (KR); Rakjoon Chung, Suwon-si (KR); Sunpyo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 300 days.

(21) Appl. No.: 17/670,977

(22) Filed: Feb. 14, 2022

(65) Prior Publication Data

US 2022/0176556 A1    Jun. 9, 2022

Related U.S. Application Data

(63) Continuation of application No. PCT/KR2021/016436, filed on Nov. 11, 2021.

(30) Foreign Application Priority Data

Dec. 3, 2020   (KR) .................. 10-2020-0167799
May 18, 2021   (KR) .................. 10-2021-0064206

(51) Int. Cl.
*B25J 9/16*     (2006.01)
*B25J 13/08*    (2006.01)

(52) U.S. Cl.
CPC ........... *B25J 9/1612* (2013.01); *B25J 9/1638* (2013.01); *B25J 9/1653* (2013.01); *B25J 9/1664* (2013.01); *B25J 13/082* (2013.01)

(58) Field of Classification Search
CPC ...... B25J 9/1612; B25J 9/1638; B25J 9/1653; B25J 9/1664; B25J 13/082; B25J 9/16;
(Continued)

(56) References Cited

U.S. PATENT DOCUMENTS 8,935,004 B2    1/2015  Iida
9,272,417 B2    3/2016  Konolige et al.
(Continued)

FOREIGN PATENT DOCUMENTS

JP      8-90475 A       4/1996
JP      2009-220248 A   10/2009
(Continued)

OTHER PUBLICATIONS

International Search Report (PCT/ISA/210) issued Mar. 2, 2022 by the International Searching Authority in International Application No. PCT/KR2021/016436.
(Continued)

*Primary Examiner* — Adam R Mott
*Assistant Examiner* — Alyzia N Dilworth
(74) *Attorney, Agent, or Firm* — Sughrue Mion, PLLC (57) ABSTRACT

A manipulator is provided. The manipulator includes a gripper, a depth sensor, a force sensor configured to sense an external force acting on the gripper; a memory storing instructions; and a processor configured to execute the instructions to: control the gripper to grasp an object, acquire first information on the object based on a first sensing value obtained by the force sensor while grasping the object, control the gripper such that a first area of the object comes into contact with a surface on which the object is to be placed, acquire location information on a contact area between the first area and the surface, acquire a rotation direction to rotate the object based on the location information and the first information on the object, control the
(Continued)

gripper to rotate the object in the rotation direction around the contact area, and based on a second area of the object being in contact with the surface, control the gripper to release the object.

17 Claims, 7 Drawing Sheets

(58) Field of Classification Search
 CPC .......... B25J 13/085; B25J 19/02; B25J 15/10;
 G05B 2219/40586
 See application file for complete search history.

(56) References Cited

U.S. PATENT DOCUMENTS

| | | | |
|---|---|---|---|
| 9,630,316 | B2 | 4/2017 | Konolige et al. |
| 9,701,492 | B2 | 7/2017 | Criswell |
| 11,117,261 | B2 | 9/2021 | Mori et al. |
| 2011/0268548 | A1 | 11/2011 | Doll |
| 2012/0253516 | A1 | 10/2012 | Iida |
| 2016/0016311 | A1 | 1/2016 | Konolige et al. |
| 2016/0136808 | A1 | 5/2016 | Konolige et al. |
| 2017/0266816 | A1 | 9/2017 | Takeuchi |
| 2019/0126483 | A1 | 5/2019 | Haddadin |
| 2019/0224847 | A1 | 7/2019 | Mori et al. |
| 2022/0152820 | A1 | 5/2022 | Spenninger et al. |
| 2024/0009857 | A1* | 1/2024 | Nagakari ................ B25J 15/08 |

FOREIGN PATENT DOCUMENTS

| | | | |
|---|---|---|---|
| JP | 2012-2006206 | A | 10/2012 |
| JP | 5112115 | B2 | 1/2013 |
| JP | 2013-43232 | A | 3/2013 |
| JP | 2019-126866 | A | 8/2019 |
| JP | 2019-202406 | A | 11/2019 |
| JP | 6832599 | B1 | 2/2021 |
| KR | 10-1457023 | B1 | 11/2014 |
| KR | 10-1902678 | B1 | 9/2018 |
| KR | 10-2018-0137548 | A | 12/2018 |
| KR | 10-2022-0020251 | A | 2/2022 |

OTHER PUBLICATIONS

Written Opinion (PCT/ISA/237) issued Mar. 2, 2022 by the International Searching Authority in International Application No. PCT/KR2021/016436.

Communication dated Apr. 29, 2024 issued by the Europen Patent Office in App No. 21900855.4.

* cited by examiner

$d_{min,A} = \min(d_{ei}, \ldots, d_{en}, d_{vi}, \ldots, d_{vn})$ $A^* = \mathrm{argmax}_A \, d_{min,A}$

MANIPULATOR AND METHOD FOR CONTROLLING THEREOF

CROSS-REFERENCE TO RELATED APPLICATION(S)

This application is a bypass continuation of International Application No. PCT/KR2021/016436, filed on Nov. 11, 2021, which is based on and claims priority to Korean Patent Application No. 10-2020-0167799, filed on Dec. 3, 2020, in the Korean Patent Office and Korean Patent Application No. 10-2021-0064206, filed on May 18, 2021, in the Korean Patent Office, the disclosures of which are incorporated by reference herein in their entireties.

BACKGROUND

Field

The disclosure relates to a manipulator and a method for controlling thereof and, more particularly, to a manipulator for seating an object on the ground and a method for controlling thereof.

Description of Related Art

In recent years, with the development of robot technology, various types of robots, such as cleaning robots, service robots, industrial robots, or the like are being used. As an example of the industrial robot, there is a manipulator in the form of a human hand and arm to perform various operations.

Figure 1:
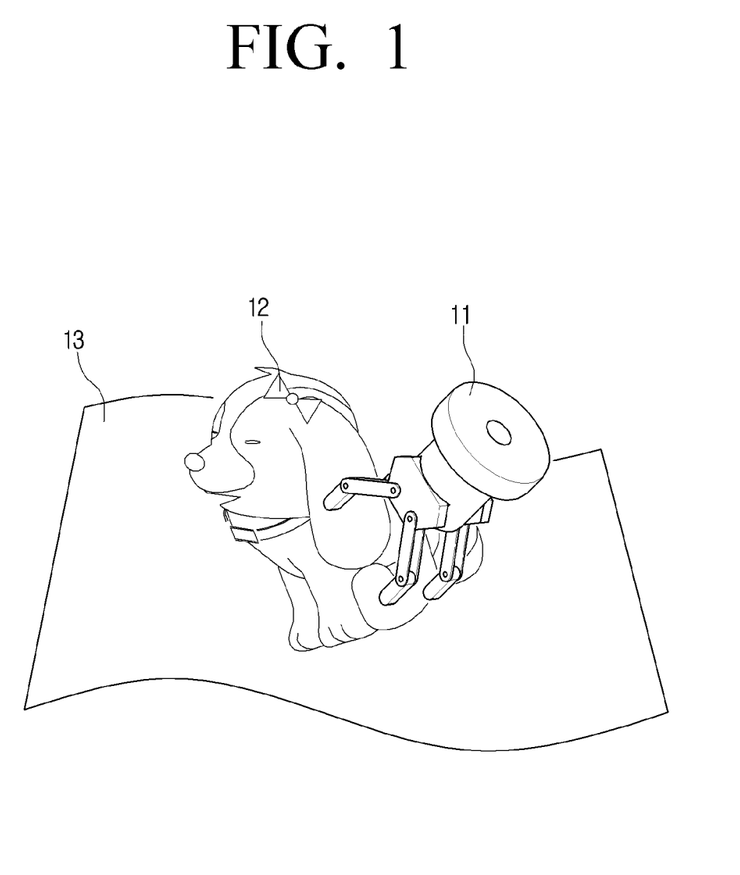
FIG. 1 is a diagram illustrating a placing operation of a manipulator.

FIG. 1 is a diagram illustrating a placing operation of a manipulator. Referring to FIG. 1, a manipulator 11 may perform a placing operation of placing a grasped object 12 on a ground or surface 13. In this case, the manipulator 11 must stably place an object such that the object does not fall over. In current placing methods, a posture of the object 12 is estimated based on shape information of the object 12, and placement is performed based on the estimated posture. However, in the current method, the posture of the object 12 cannot be accurately estimated when the shape of the object 12 is asymmetric, and thus there is a limitation in a stable placing.

Accordingly, there is a need for a technique for a more stable placing method.

SUMMARY

Provided is a manipulator capable of stably placing an object.

Additional aspects will be set forth in part in the description which follows and, in part, will be apparent from the description, or may be learned by practice of the presented embodiments.

According to an aspect of the disclosure, there is provided a manipulator including: a gripper; a depth sensor; a force sensor configured to sense an external force acting on the gripper; a memory storing instructions; and a processor configured to execute the instructions to: control the gripper to grasp an object, acquire first information on the object based on a first sensing value obtained by the force sensor while grasping the object, control the gripper such that a first area of the object comes into contact with a surface on which the object is to be placed, acquire location information on a contact area between the first area and the surface, acquire a rotation direction to rotate the object based on the location information and the first information on the object, control the gripper to rotate the object in the rotation direction around the contact area, and based on a second area of the object being in contact with the surface, control the gripper to release the object.

The first information on the object may include information on gravity acting on the object, and information on a distance from the force sensor to a line of action of the gravity.

The processor may be further configured to execute the instructions to acquire the location information on the contact area based on the first information on the object, a second sensing value obtained by the depth sensor with respect to the surface, and a third sensing value obtained by the force sensor while the first area is in contact with the surface.

The processor may be further configured to execute the instructions to: acquire a torque centered on the contact area based on the first information on the object and the location information, and acquire the rotation direction based on the torque.

The processor may be further configured to execute the instructions to identify that the first area comes into contact with the surface based on the first sensing value obtained by the force sensor being greater than a first value.

The processor may be further configured to execute the instructions to identify that the second area comes into contact with the surface based on a change amount of the first sensing value obtained by the force sensor for a predetermined time being greater than a second value.

The processor may be further configured to execute the instructions to: acquire shape information on the object based on a second sensing value obtained by the depth sensor, and identify a seating surface of the object including the first area and the second area based on the shape information on the object.

The processor may be further configured to execute the instructions to control the gripper such that the first area comes into contact with the surface based on a difference between a first direction of a first normal vector with respect to the surface and a second direction of a second normal vector with respect to the seating surface being within a predetermined range.

According to an aspect of the disclosure, there is provided a method for controlling a manipulator including a gripper, a depth sensor, and a force sensor configured to acquire an external force acting on the gripper, the method including: grasping an object with the gripper; acquiring first information on the object based on a first sensing value obtained by the force sensor while grasping the object; contacting a surface on which the object is to be placed with a first area of the object; acquiring location information on a contact area between the first area and the surface; acquiring a rotation direction to rotate the object based on the location information and the first information on the object; rotating the object in the rotation direction around the contact area; and based on a second area of the object being in contact with the surface, releasing the object by the gripper.

The first information on the object may include information on gravity acting on the object, and information on a distance from the force sensor to a line of action of the gravity.

The acquiring the location information on the contact area may include acquiring location information on the contact area based on the first information on the object, a second sensing value obtained the depth sensor with respect to the surface, and a third sensing value obtained by the force sensor while the first area is in contact with the surface.

The acquiring the rotation direction may include: acquiring a torque centered on the contact area based on the first information on the object and the location information, and acquiring the rotation direction based on the torque.

The method may further include identifying that the first area comes into contact with the surface based on the first sensing value of the force sensor being greater than a first value.

The method may further include identifying that the second area comes into contact with the surface based on a change amount of the first sensing value obtained by the force sensor for a predetermined time being greater than a second value.

The method may further include: acquiring shape information on the object based on a sensing value obtained by the depth sensor; and identifying a seating surface of the object including the first area and the second area based on the shape information on the object.

According to various embodiments of the disclosure as described above, a manipulator may stably place an object. Accordingly, an accident in which the object falls over during the placing process may be prevented.

In addition, effects acquirable or predicted by the embodiments of the disclosure are to be disclosed directly or implicitly in the detailed description of the embodiments of the disclosure. For example, various effects predicted according to embodiments of the disclosure will be disclosed in the detailed description to be described below.

Other aspects, advantages and prominent features of the disclosure will become apparent to those skilled in the art from the following detailed description, which discloses various embodiments of the disclosure taken in conjunction with the accompanying drawings.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, or the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the invention with unnecessary detail.

Figure 2:
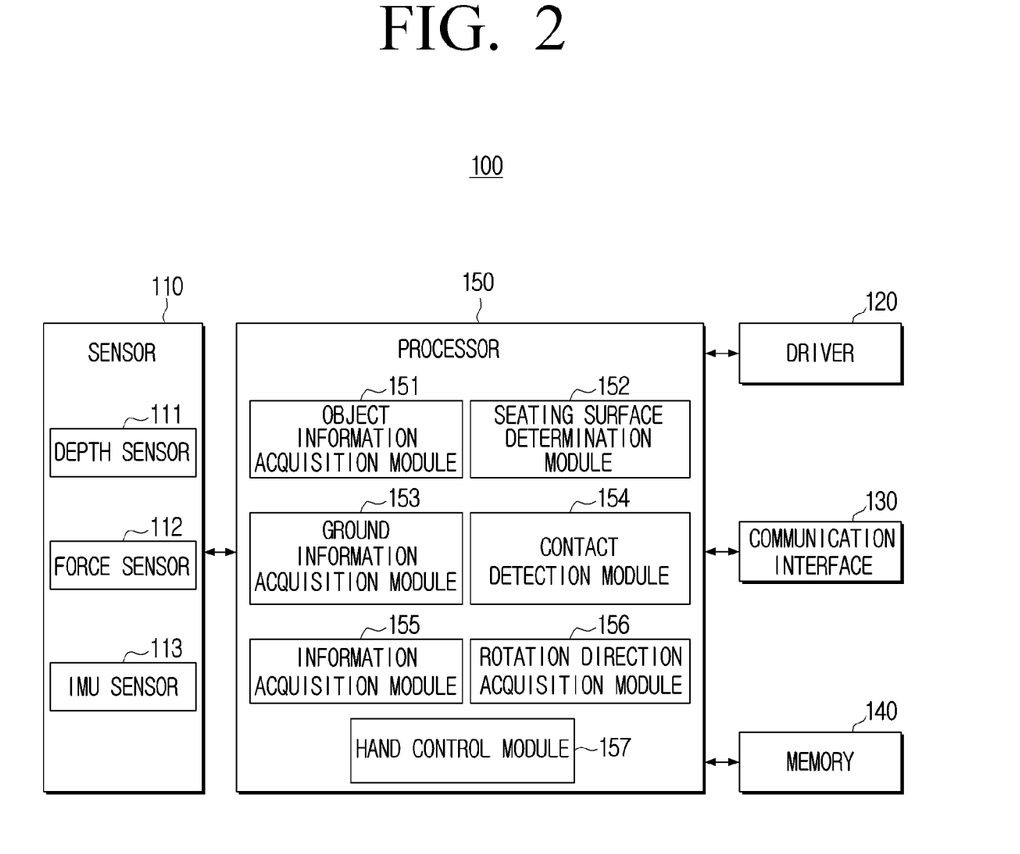
FIG. 2 is a diagram illustrating a configuration of a manipulator according to an embodiment.

FIG. 2 is a diagram illustrating a configuration of a manipulator according to an embodiment of the disclosure. The manipulator 100 may include a sensor 110, a driver 120, a communication interface 130, a memory 140, and a processor 150.

The sensor 110 may include a depth sensor 111. The depth sensor 111 may sense an object or the ground or surface around the manipulator 100. The processor 150 may acquire an object or shape information (e.g., a point cloud) of the ground on which the object is to be seated based on a sensing value of the depth sensor 111. The depth sensor 111 may include an RGB-D sensor, a light detection and ranging (LiDAR) sensor, and a time-of-flight (ToF) sensor.

The sensor 110 may include a force sensor 112. The force sensor 112 may be provided in a hand or gripper and a joint included in the manipulator 100 to sense an external force acting on the hand and the joint. For example, the force sensor 112 may sense gravity acting on an object grasped by the hand. That is, the force sensor 112 may sense the weight of the object grasped by the hand. The force sensor 112 may include a force/torque (F/T) sensor.

The sensor 110 may include an inertial measurement unit (IMU) sensor 113. The processor 150 may acquire acceleration information or angular velocity information of the manipulator 100 based on a sensing value of the IMU sensor 113. Also, the sensor 110 may include an RGB camera. The processor 150 may identify an object included in a photographed image photographed by the RGB camera. In addition, the sensor 110 may include an encoder for acquiring locations and speeds of joints and links included in the manipulator 100. The encoder may sense the location and rotation speed of a motor for driving the joint.

The driver 120 may include an actuator that provides power to the manipulator 100. For example, the actuator may provide torque to the hand and joint. The actuator may include various types of motors, such as linear motors, alternating current (AC) sub-motors, step motors, or the like.

The communication interface 130 may include at least one circuit and may communicate with various types of external devices according to various types of communication methods. For example, the communication interface 130 may acquire information on the ground or surface on which the object is to be placed from an external device or an external server. The information on the ground may include location and shape of the ground, and direction of a normal vector. The communication interface 130 may include at least one of a Wi-Fi module, a Bluetooth module, a ZigBee module, a Beacon module, a cellular communication module, a 3rd generation (3G) mobile communication module, 4th generation (4G) mobile communication module, a 4G long term evolution (LTE) communication module, and a 5th generation (5G) mobile communication module.

The memory 140 may store an operating system (OS) for controlling overall operations of the components of the manipulator 100 and commands or data related to components of the manipulator 100. For example, the memory 140 may store information about the object. The information on the object may include a magnitude of gravity acting on the object, and a distance (i.e., a moment arm) from the force sensor 112 to an action line of gravity.

The memory 140 may store data necessary for a module for controlling an operation of the manipulator 100 to perform various operations. Modules for controlling the operation of the manipulator 100 may include an object information acquisition module 151, a seating surface determination module 152, a ground information acquisition module 153, a contact detection module 154, and a contact information acquisition module 155, a rotation direction acquisition module 156 and a hand control module 157. The memory 140 may be implemented as a non-volatile memory (e.g., a hard disk, a solid state drive (SSD), a flash memory), a volatile memory, or the like.

The processor 150 may be electrically connected to the memory 140 to control overall functions and operations of the manipulator 100. When a user command for operating the manipulator 100 is input, the processor 150 may load data for modules 151 to 157 stored in the non-volatile memory to perform various operations into the volatile memory. The loading refers to an operation of loading and storing data stored in the non-volatile memory into the volatile memory such that it can be accessed by the processor 150.

The object information acquisition module 151 may acquire various information about the object. For example, the object information acquisition module 151 may acquire shape information of an object based on a sensing value of the depth sensor 111. The shape information of the object may include a point cloud corresponding to the object.

As another example, the object information acquisition module 151 may acquire a weight of the object grasped by the manipulator 100. The object information acquisition module 151 may acquire gravity (i.e., a weight of an object) acting on the object based on a sensing value of the force sensor 112 acquired in a state in which the manipulator 100 is stopped while grasping the object.

As another example, the object information acquisition module 151 may acquire a first moment arm corresponding to the object. The first moment arm may refer to a distance from the force sensor 112 to a line of action of gravity acting on the object in a state where the object and the ground do not contact each other. The object information acquisition module 151 may acquire the first moment arm based on the force and torque sensed by the force sensor 112. For example, the object information acquisition module 151 may acquire the first moment arm ($h_g^s$) corresponding to the object based on Equation (1).

$$h_g^z = \frac{f_g^z \times \tau_g^s}{\|f_g^s\|^2} \quad (1)$$

where each of $f_g^s$ and $\tau_g^s$ refers to force and torque sensed by the force sensor 112 in a state that the hand grasps the object.

The information about the acquired object may be stored in the memory 140.

The seating surface determination module 152 may determine a seating surface of the object to come into contact with the ground on which the object is to be placed. The seating surface determination module 152 may generate a plurality of convex hulls for an object based on a point cloud corresponding to the object. The convex hull may refer to a virtual two-dimensional plane in a form of a polygon including a partial area of an object. The seating surface determination module 152 may identify one convex hull including a seating surface among a plurality of convex hulls. For example, the seating surface determination module 152 may identify a convex hull in which a minimum distance from a point corresponding to a center of gravity of an object to an edge of the convex hull is maximum among a plurality of convex hulls. A more detailed description of the method of identifying the seating surface will be described below with reference to FIG. 4

The ground information acquisition module 153 may acquire information on the ground. Particularly, the ground information acquisition module 153 may acquire a normal vector corresponding to the ground. The ground information acquisition module 153 may acquire a point cloud corresponding to the ground based on a sensing value of the depth sensor 111. In addition, the ground information acquisition module 153 may acquire an average normal vector corresponding to the ground based on the point cloud.

Herein, the ground may refer to an arbitrary surface on which an object is placed, and may include a surface of a workbench or table on which an object can be placed as well as a ground in the dictionary meaning. In addition, the ground may have a flat shape, but is not limited thereto and may have a curved shape.

The contact detection module 154 may detect a contact between the object and the ground. For example, the contact detection module 154 may identify whether the object comes into contact with the ground based on a value sensed by the force sensor 112. When a value acquired by subtracting a weight of the object stored in the memory 140 from a magnitude of a force sensed by the force sensor 112 is greater than a predetermined first value, the contact detection module 154 may identify that the object comes into contact with the ground. Alternatively, the contact detection module 154 may identify that the object comes into contact with the ground by comparing the magnitude of the force sensed by the force sensor 112 with a predetermined value.

In addition, the contact detection module 154 may identify whether the object comes into contact with the ground based on the amount of change in the value sensed by the force sensor 112. For example, if the amount of change in the value sensed by the force sensor 112 sensed for a predetermined time is greater than a predetermined second value, the contact detection module 154 may identify that the object comes into contact with the ground.

A contact detection method of the contact detection module 154 may vary depending on a contact state between the object and the ground. For example, when the object and the ground do not contact (i.e., a first state), the contact detection module 154 may identify whether the object comes into contact with the ground by comparing a value obtained by subtracting the weight of the object stored in the memory 140 from a magnitude of the force sensed by the force sensor 112 with a predetermined first value. When a first area of the object comes into contact with the ground (i.e., a second state), the contact detection module 154 may identify whether the second area of the object comes into contact with the ground by comparing the amount of change in the sensed value of the force sensor 112 with a predetermined second value.

The contact detection method using the force sensor 112 has been described in the above, but this is only an embodiment, and the contact detection module 154 may identify whether the object comes into contact with the ground based on a value sensed by the IMU sensor 113. For example, when a magnitude of a signal sensed by the IMU sensor 113 is greater than a predetermined value, the contact detection module 154 may identify that the object comes into contact with the ground.

The contact information acquisition module 155 may acquire location information about a contact area between the object and the ground. The contact information acquisition module 155 may acquire a second moment arm ($h_c^s$), which is a distance from the force sensor 112 to a line of action of an external force by contact. For example, the contact information acquisition module 155 may acquire the second moment arm ($h_c^s$) based on a value sensed by the force sensor 112 sensed when the object comes into contact with the ground. The contact information acquisition module 155 may calculate the second moment arm ($h_c^s$) based on Equations (2) and (3).

$$f_c^z = f^z(t) - f_g^z, \; r_c^z = r^z(t) - r_g^s \tag{2}$$

$$h_c^s = \frac{f_c^s \times \tau_c^s}{\|f_c^s\|^2} \tag{3}$$

$f^s(t)$ and $\tau^s(t)$ refers to a sensing value (i.e., force/torque) of the force sensor 112 sensed when the object comes into contact with the ground, and also $f_g^s$ and $\tau_g^s$ refer to a sensing value acquired before the contact of object and the ground. In other words, $f_g^s$ and $\tau_g^s$ refer to information on an object stored in the memory 140.

The contact information acquisition module 155 may acquire an external force ($f_c^s$, $\tau_c^s$) caused by the contact between the object and the ground by subtracting a sensing value) before the object comes into contact with the ground from a sensing value ($f^s(t)$, $\tau^s(t)$) when the object comes into contact with the ground. Also, the contact information acquisition module 155 may acquire a second moment arm ($h_c^s$) based on the external force ($f_c^s$, $\tau_c^s$) by the contact.

The contact information acquisition module 155 may acquire a location of a contact area) based on the external force ($f_c^s$, $\tau_c^s$) by the contact, information on the object ($f_g^s$, $\tau_g^s$), and the sensing value of the depth sensor 111. The contact information acquisition module 155 may acquire a location ($\tau_c^s$) of the contact area based on Equation (4) and (5).

$$\begin{cases} r_c^s = h_c^s + a f_c^s \\ n^s \cdot r_c^s + b^s = 0 \end{cases} \tag{4}$$

$$r_c^s = h_c^s - \frac{b^z + n^s \cdot h_c^s}{n^s \cdot f_c^z} f_c^s \tag{5}$$

The equation ($n^s \cdot r_c^s + b^z = 0$) indicates a plane equation corresponding to the ground. The contact information acquisition module 155 may acquire a point cloud corresponding to the ground based on the sensing value of the depth sensor 111. In addition, the contact information acquisition module 155 may acquire a plane equation (i.e., $n^s \cdot r_c^s \cdot b^z = 0$) based on a point cloud and a plane extraction algorithm.

The rotation direction acquisition module 156 may acquire a rotation direction for rotating the object based on the contact area as a rotation center. For example, the rotation direction acquisition module 156 may acquire the rotation direction based on the information ($f_g^s$, $\tau_g^s$) on the object and the location ($r_c^s$) of the contact area. The rotation direction acquisition module 156 may acquire the rotation direction ($\hat{\omega}_{rot}^s$) based on Equations (6) and (7).

$$\tau_{cg}^s = (h_g^s - r_g^s) \times f_g^s \tag{6}$$

$$\hat{\omega}_{rot}^s := \frac{\tau_{cg}^s}{\|\tau_{cg}^s\|} \tag{7}$$

The rotation direction acquisition module 156 may acquire a torque ($\tau_{cg}^s$) around the contact area as a center of rotation based on a vector ($h_g^s - r_c^s$) from the contact area between the object and the ground to a line of action of gravity and gravity ($f_g^s$) acting on the object. Also, the rotation direction acquisition module 156 may acquire a rotation direction ($\hat{\omega}_{rot}^s$) based on the acquired torque ($\tau_{cg}^s$).

The hand control module 157 may generate a control command for controlling a hand included in the manipulator 100 and may control an operation of the hand based on the control command. For example, the hand control module 157 may control the hand to grasp the object. Also, the hand control module 157 may control the hand to move or rotate while grasping the object. In this case, when a difference between a first direction of a first normal vector with respect to a seating surface of the object and a second direction of a second normal vector with respect to the ground is within a predetermined range, the hand control module 157 may control the hand such that the object comes into contact with the ground. Accordingly, the first area of the object may contact the ground. In addition, the hand control module 157 may rotate the object in a rotation direction ($\hat{\omega}_{rot}^s$) with the first area of the object and the contact area of the ground as a rotation center. Accordingly, the second area of the object may come into contact with the ground. If it is identified that the second area of the object comes into contact with the ground, the hand control module 157 may control the hand to release the grasp of the object.

Figure 3:
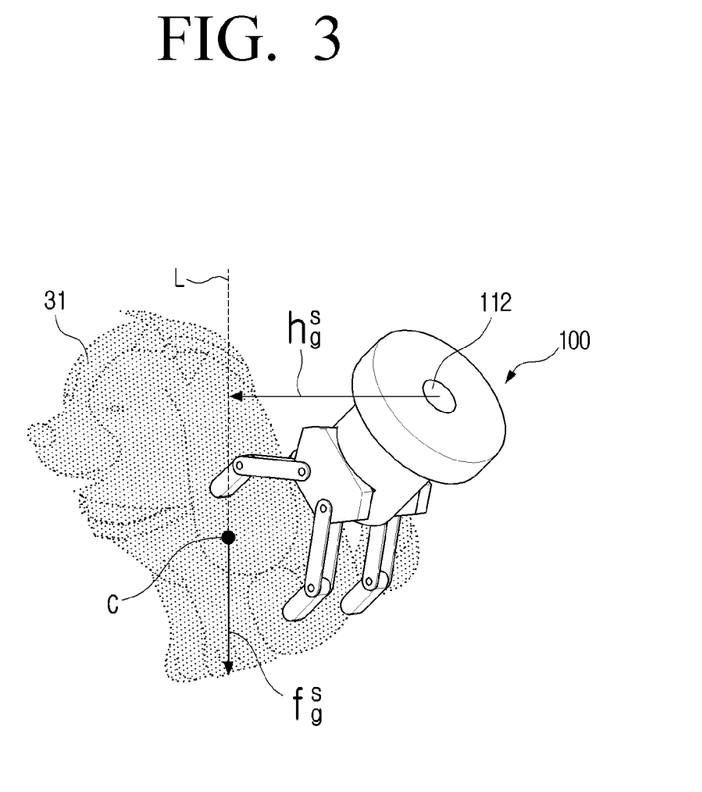
FIG. 3 is a diagram illustrating information acquired by a manipulator according to an embodiment.

FIG. 3 is a diagram illustrating information acquired by a manipulator according to an embodiment of the disclosure. Referring to FIG. 3, the manipulator 100 may acquire a point cloud corresponding to an object 31 based on a sensing value of the depth sensor 111. Also, the manipulator 100 may acquire a force ($f_g^s$) and a torque ($\tau_g^s$) acting on the object 31 based on a sensing value of the force sensor 112. Also, the manipulator 100 may acquire a first moment arm ($h_g^s$) corresponding to the object based on the Equation (1) described above. The first moment arm ($h_g^s$) means a distance from the force sensor 112 to a line of action L of gravity. The line of action L of gravity may pass through a center of gravity C of the object 31.

Figure 4:
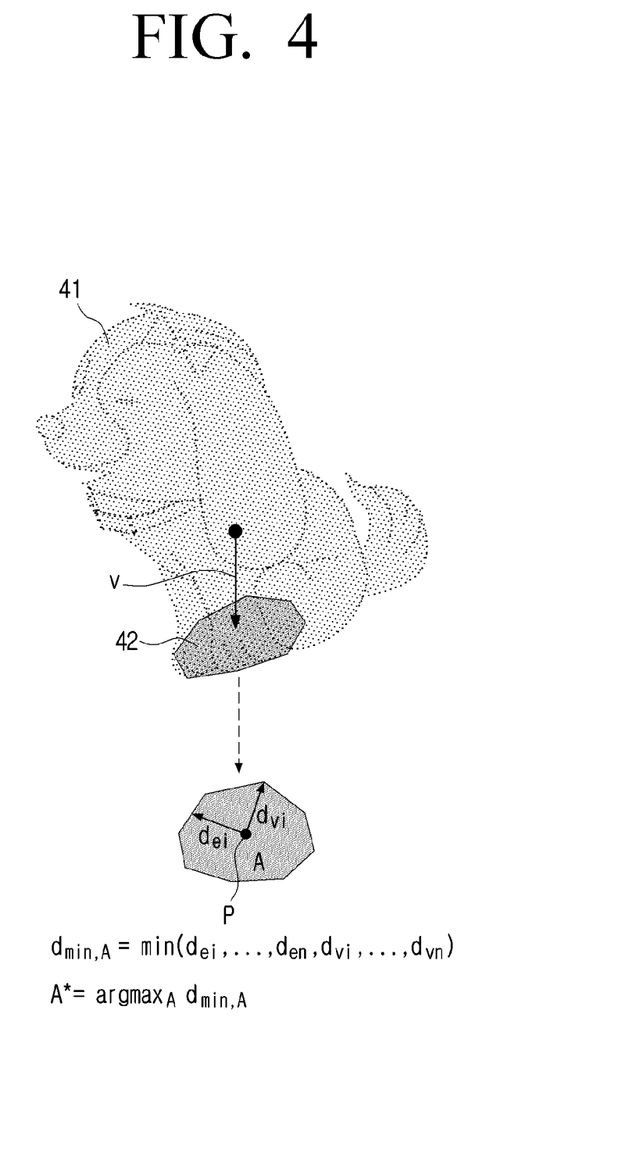
FIG. 4 is a diagram illustrating a method of determining a seating surface of an object according to an embodiment.

FIG. 4 is a diagram illustrating a method of determining a seating surface of an object according to an embodiment of the disclosure. The manipulator 100 may determine a seating surface 42 to come into contact with the ground among a plurality of surfaces of an object 41. The manipulator 100 may generate a plurality of convex hulls with respect to the object 41 based on a point cloud corresponding to the object 41. The manipulator 100, for each of the plurality of convex hulls, may calculate gravity vector v passing through a center of the point cloud and a distance from an intersection P of the convex hull to a side of the convex hull ($d_{si}$), and a distance ($d_{pi}$) from the intersection P to a vertex. The manipulator 100 may determine a convex hull where a minimum value ($d_{min, A}$) of a distance from the intersection P to the side/vertex of the convex hull is a maximum convex hull, among a plurality of convex hulls, as a seating value $A^s$.

The manipulator 100 may move the object 41 such that the determined seating surface 42 comes into contact with the ground. In this case, the manipulator 100 may move the object 41 such that a difference between the first direction of the first normal vector with respect to the ground and the second direction of the second normal vector with respect to the seating surface 42 is within a predetermined range. Accordingly, as shown in FIG. 5, a first area A1 of an object 51 may come into contact with a ground 52.

Figure 5:
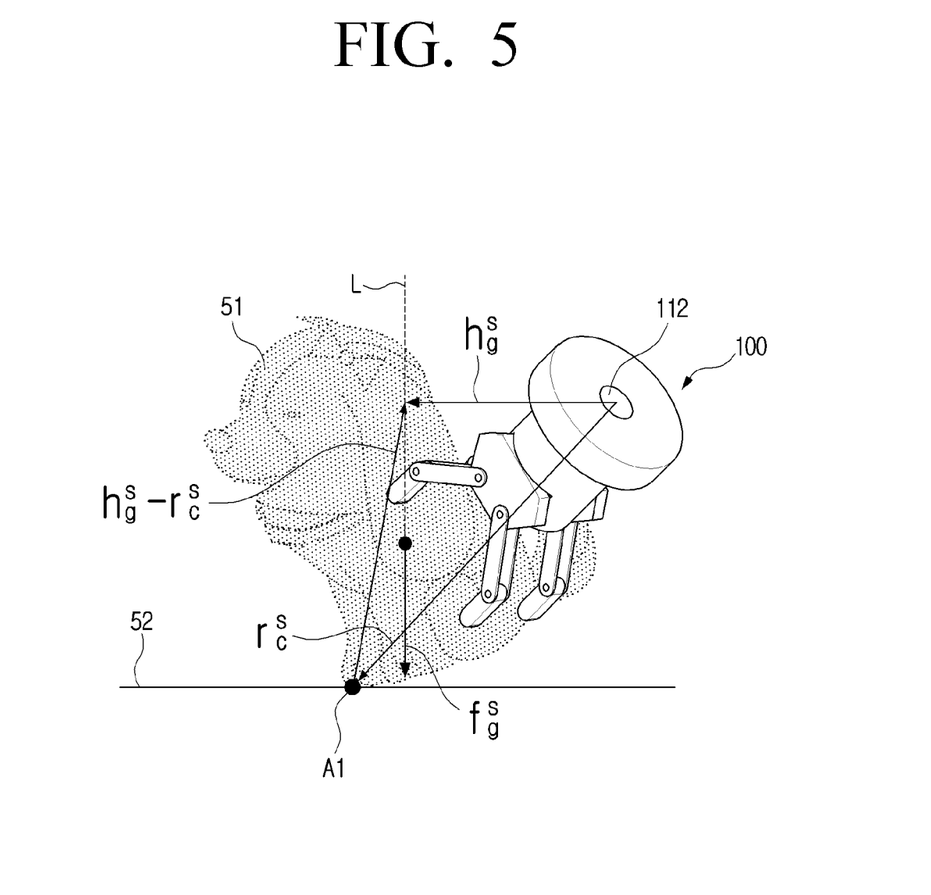
FIG. 5 is a diagram illustrating a method of acquiring a rotation direction according to an embodiment.

FIG. 5 is a diagram illustrating a method for acquiring a rotation direction according to an embodiment of the disclosure. The manipulator 100 may rotate the object 51 around the first area A1 that is a contact area between the object 51 and the ground 52. The manipulator 100 may acquire a rotation direction to rotate the object 51. For example, the manipulator 100 may acquire a torque ($\tau_{cg}^s$) with the contact area A1 as the rotation center, based on a vector ($h_g^s - r_c^s$) from the contact area A1 of the object 51 and the ground 52 to the line of action L of gravity and gravity ($f_g^s$) acting on the object 51. The manipulator 100 may acquire the torque (' based on Equations (6) and (7) described above. In addition, the manipulator 100 may acquire a rotation direction ($\omega_{rot}^s$) based on the acquired torque ($\tau_{cg}^s$).

Figure 6:
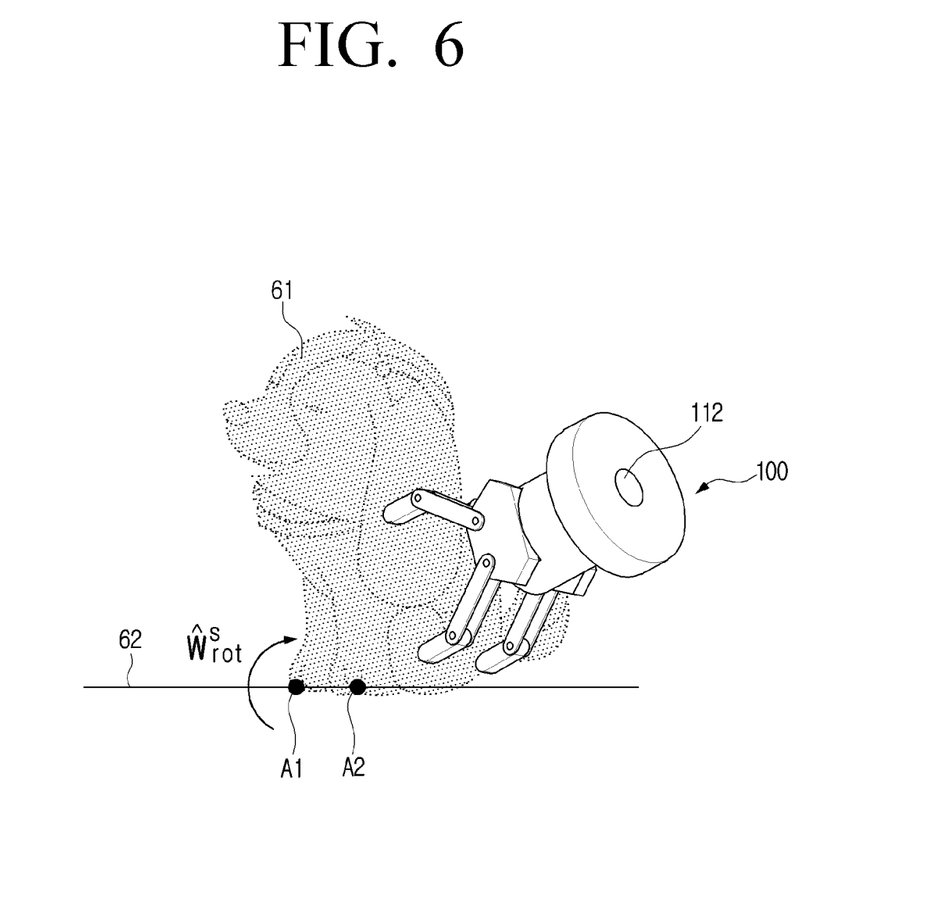
FIG. 6 is a diagram illustrating a method of placing an object according to an embodiment.

FIG. 6 is a diagram illustrating a method of placing an object according to an embodiment. As shown in FIG. 6, the manipulator 100 may rotate an object 61 based on the rotation direction ($\hat{\omega}_{rot}^s$) Accordingly, a second area A2 of the object 61 may come into contact with a ground 62. The manipulator 100 may identify that the second area A2 comes into contact with the ground 62 when the amount of change in a sensing value of the force sensor 112 for a predetermined time is greater than a predetermined second value. In addition, the manipulator 100 may release a grasp of the object 61. Accordingly, the object 61 may be stably placed on the ground 62.

Figure 7:
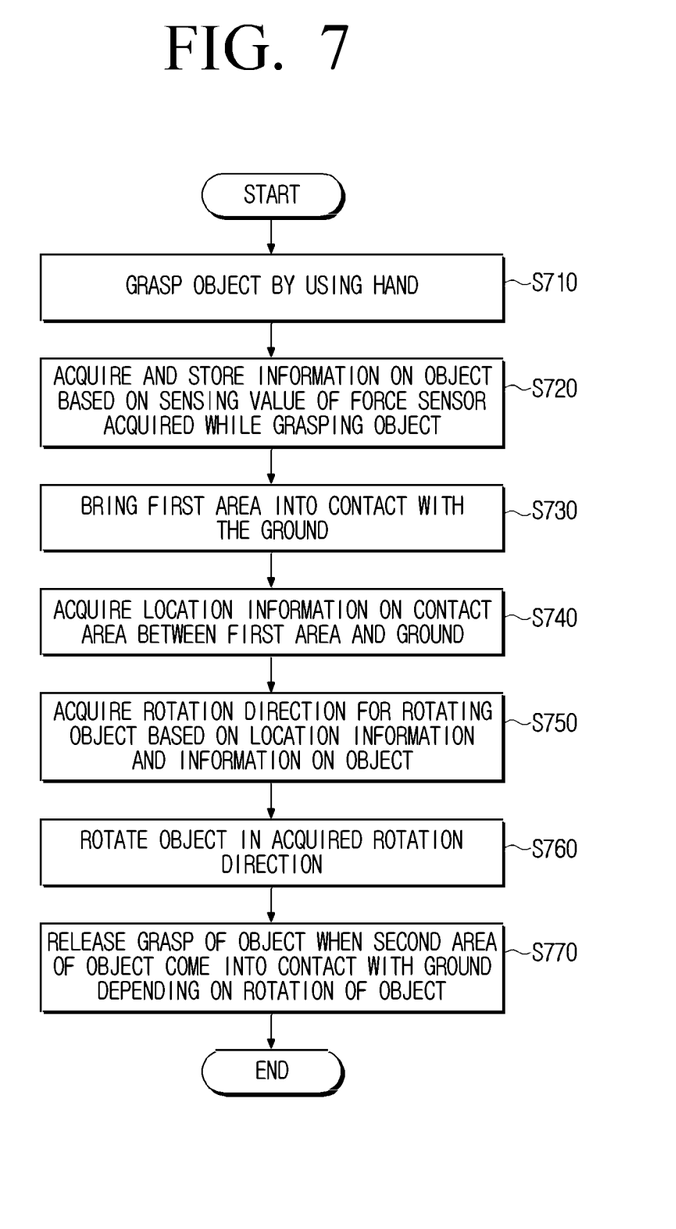
FIG. 7 is a flowchart of a method for controlling a manipulator according to an embodiment.

FIG. 7 is a flowchart of a method for controlling a manipulator according to an embodiment of the disclosure.

In operation S710, the manipulator 100 may grasp an object by using a hand.

In operation S720, the manipulator 100 may acquire and store information on the object based on a sensing value of the force sensor acquired while grasping the object. In this case, the manipulator 100 may acquire location information on a contact area based on the stored object information, a sensing value of a depth sensor with respect to the ground, and a sensing value of the force sensor acquired when the ground comes into contact with the first area.

In operation S730, the manipulator 100 may bring the first area of the object into contact with the ground. In this case, the manipulator 100 may bring the first area of the object into contact with ground such that a difference between a first direction of a first normal vector with respect to the ground and a second direction of a second normal vector with respect to a seating surface is within a predetermined range. The seating surface of the object may be acquired based on shape information of an object acquired based on the sensing value of the depth sensor. When the sensing value of the force sensor is greater than a first predetermined value, the manipulator 100 may identify that the first area comes into contact with the ground.

In operation S740, the manipulator 100 may acquire location information on the contact area between the first area and the ground. The manipulator 100 may acquire location information on a contact area based on the object information, the sensing value of the depth sensor with respect to the ground, and the sensing value of the force sensor acquired when the ground comes into contact with the first area.

In operation S750, the manipulator 100 may acquire a rotation direction for rotating the object based on the location information and the information on the object.

In operation S760, the manipulator 100 may rotate the object in the acquired rotation direction. In this case, the manipulator 100 may rotate the object around the contact area as a rotation center.

In operation S770, when a second area of the object comes into contact with the ground depending on the rotation of the object, the manipulator 100 may release the grasp of the object. When the amount of change in the sensing value of the force sensor for a predetermined time is greater than a predetermined second value, the manipulator 100 may identify that the second area comes into contact with the ground.

Various exemplary embodiments described above may be embodied in a recording medium that may be read by a computer or a similar apparatus to the computer by using software, hardware, or a combination thereof. In some cases, embodiments described herein may be implemented by the processor itself. In a software configuration, various embodiments described in the specification such as a procedure and a function may be embodied as separate software modules. The software modules may respectively perform one or more functions and operations described in the present specification.

Methods of controlling a display apparatus according to various exemplary embodiments may be stored on a non-transitory readable medium. When the computer instructions stored in such a non-transitory computer-readable medium are executed by a processor, a specific apparatus may perform a processing operation according to various embodiments described above.

The non-transitory computer readable recording medium refers to a medium that stores data and that can be read by devices. For example, the non-transitory computer-readable medium may be a compact disc (CD), a digital versatile disc (DVD), a hard disc, Blu-ray disc, universal serial bus (USB), a memory card, a read-only memory (ROM), or the like.

The foregoing exemplary embodiments and advantages are merely exemplary and are not to be construed as limiting the disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A manipulator comprising:
a gripper;
a depth sensor;
a force sensor configured to sense an external force acting on the gripper;
a memory storing instructions; and
a processor configured to execute the instructions to:
control the gripper to grasp an object,
acquire first information on the object based on a first sensing value obtained by the force sensor while grasping the object,
control the gripper such that a first area of the object comes into contact with a surface on which the object is to be placed,
acquire location information on a contact area between the first area of the object and the surface that the object contacts,
acquire a torque with the contact area as a rotation center based on a vector from the contact area between the first area of the object and the surface that the object contacts and a line of action of gravity acting on the object;
acquire a rotation direction to rotate the object based on the acquired torque,
control the gripper to rotate the object in the rotation direction around the contact area, and
based on a second area of the object being in contact with the surface, control the gripper to release the object.

2. The manipulator of claim 1, wherein the first information on the object comprises information on the gravity acting on the object, and information on a distance from the force sensor to the line of action of the gravity.

3. The manipulator of claim 1, wherein the processor is further configured to execute the instructions to acquire the location information on the contact area based on the first information on the object, a second sensing value obtained by the depth sensor with respect to the surface, and a third sensing value obtained by the force sensor while the first area is in contact with the surface.

4. The manipulator of claim 1, wherein the processor is further configured to execute the instructions to identify that the first area comes into contact with the surface based on the first sensing value obtained by the force sensor being greater than a first value.

5. The manipulator of claim 1, wherein the processor is further configured to execute the instructions to identify that the second area comes into contact with the surface based on a change amount of the first sensing value obtained by the force sensor for a predetermined time being greater than a second value.

6. The manipulator of claim 1, wherein the processor is further configured to execute the instructions to:
acquire shape information on the object based on a second sensing value obtained by the depth sensor, and
identify a seating surface of the object including the first area and the second area based on the shape information on the object.

7. The manipulator of claim 6, wherein the processor is further configured to execute the instructions to control the gripper such that the first area comes into contact with the surface based on a difference between a first direction of a first normal vector with respect to the surface and a second direction of a second normal vector with respect to the seating surface being within a predetermined range.

8. A method for controlling a manipulator comprising a gripper, a depth sensor, and a force sensor configured to acquire an external force acting on the gripper, the method comprising:
grasping an object with the gripper;
acquiring first information on the object based on a first sensing value obtained by the force sensor while grasping the object;
contacting a surface on which the object is to be placed with a first area of the object;
acquiring location information on a contact area between the first area of the object and the surface that the object contacts;
acquiring a torque with the contact area as a rotation center based on a vector from the contact area between the first area of the object and the surface that the object contacts and a line of action of gravity acting on the object
acquiring a rotation direction to rotate the object based on the acquired torque;
rotating the object in the rotation direction around the contact area; and
based on a second area of the object being in contact with the surface, releasing the object by the gripper.

9. The method of claim 8, wherein the first information on the object comprises information on the gravity acting on the object, and information on a distance from the force sensor to the line of action of the gravity.

10. The method of claim 8, wherein the acquiring the location information on the contact area comprises acquiring location information on the contact area based on the first information on the object, a second sensing value obtained the depth sensor with respect to the surface, and a third sensing value obtained by the force sensor while the first area is in contact with the surface.

11. The method of claim 8, further comprising identifying that the first area comes into contact with the surface based on the first sensing value of the force sensor being greater than a first value.

12. The method of claim 8, further comprising identifying that the second area comes into contact with the surface based on a change amount of the first sensing value obtained by the force sensor for a predetermined time being greater than a second value.

13. The method of claim 8, further comprising:
acquiring shape information on the object based on a sensing value obtained by the depth sensor; and
identifying a seating surface of the object including the first area and the second area based on the shape information on the object.

14. A device comprising:
a gripper;
a memory storing instructions, and
a processor configured to execute the instructions to:
  acquire first information on an object being grasped by the gripper based on a force sensing value;
  acquire location information on a contact area between a first area of the object and a surface with which the object comes into contact;
  acquire a torque with the contact area as a rotation center based on a vector from the contact area between the first area of the object and the surface that the object contacts and a line of action of gravity acting on the object;
  acquire a rotation direction to rotate the object based on the acquired torque;
  rotate the object in the rotation direction around the contact area; and
  release the object by the gripper based on a second area of the object being in contact with the ground.

15. The device of claim 14, wherein the processor is further configured to execute the instructions to identify that the first area comes into contact with the surface based on the force sensing value being greater than a predetermined first value.

16. The device of claim 14, wherein the processor is further configured to execute the instructions to identify that the second area comes into contact with the surface based on a change amount of the force sensing value for a predetermined time being greater than a predetermined second value.

17. The device of claim 14, wherein the processor is further configured to execute the instructions to:
  acquire shape information on the object based on a depth sensing value, and
  identify a seating surface of the object including the first area and the second area based on the shape information on the object.

* * * * *